United States Patent

[11] 3,621,915

[72] Inventors Edmond H. Bruist
New Orleans;
Tyler W. Hamby, Jr., Metairie, La.;
Theodore A. Simon, Houston; Robert N. Tuttle, Houston, Tex.
[21] Appl. No. 867,631
[22] Filed Oct. 20, 1969
[45] Patented Nov. 23, 1971
[73] Assignee Shell Oil Company
New York, N.Y.

[54] METHOD FOR FORMING A CONSOLIDATED GRAVEL PACK IN A WELL BOREHOLE
15 Claims, 4 Drawing Figs.
[52] U.S. Cl. ................................................... 166/276
[51] Int. Cl. .................................................... E21b 43/04
[50] Field of Search .......................................... 166/276, 278, 290, 295, 300

[56] References Cited
UNITED STATES PATENTS

| | | | |
|---|---|---|---|
| 2,815,815 | 12/1957 | Hower et al. | 166/276 X |
| 2,823,753 | 2/1958 | Henderson et al. | 166/295 |
| 2,941,594 | 6/1960 | Ladd et al. | 166/276 |
| 2,981,334 | 4/1961 | Powell, Jr. | 166/276 |
| 3,123,137 | 3/1964 | Young et al. | 166/295 |
| 3,285,339 | 11/1966 | Walther et al. | 166/295 |
| 3,335,796 | 8/1967 | Parker, Jr. | 166/276 X |
| 3,339,633 | 9/1967 | Richardson | 166/295 |
| 3,391,738 | 7/1968 | Sparlin | 166/295 |
| 3,443,637 | 5/1969 | Sparlin et al. | 166/295 |

Primary Examiner—Stephen J. Novosad
Attorneys—Louis J. Bovasso and J. H. McCarthy ABSTRACT: A method of providing sand control of underground formations penetrated by at least one well borehole by forming an epoxy resin consolidated sand or gravel pack of high compressive strength comprising injecting into a well borehole a slurry of sand that has been coated with a solution of an epoxy-containing resin-forming material and a curing agent dissolved in a polar liquid solvent and suspended in a suitable liquid carrier, such as a hydrocarbon liquid, having a limited solubility and a limited capacity for extracting the polar solvent from the resin-forming material. The curing or polymerization reaction rate of the resin-forming components, under the borehole and formation temperature conditions, is thus controlled so that the final setting of the resin and the consolidation of the gravel pack and adjacent portions of the formation is achieved while the sand or gravel pack is in place in the portion of the well borehole in which it is to be consolidated.

PATENTED NOV 23 1971 3,621,915

INVENTORS:
EDMOND H. BRUIST
TYLER W. HAMBY JR.
THEODORE A. SIMON
ROBERT N. TUTTLE
BY: *Louis J. Bovasso*

THEIR ATTORNEY

METHOD FOR FORMING A CONSOLIDATED GRAVEL PACK IN A WELL BOREHOLE

BACKGROUND OF THE INVENTION

1. Field of the Invention

This invention generally relates to the production of oil petroleum or minerals. More particularly, the invention concerns a method of forming a consolidated gravel pack of permeable mass within and/or adjacent to a well borehole in communication with a subterranean oil-bearing earth formation.

2. Description of the Prior Art

In producing petroleum for subterranean reservoirs, many wells are drilled into or through loosely cemented or unconsolidated formations. When such a well is placed on production, sand is often carried from the formation by the fluid and deposited in the well bore. Some sand is usually entrained in the produced fluid, thus causing severe erosion and damage to equipment which is employed in the production of the fluid. The production of the sand interferes with the normal production operations and gives rise to numerous operating problems. It can generally be said that in the production of a fluid from a loosely consolidated formation, workovers are frequently necessary to remove sand from the bottom of the borehole. If the erosion of the sand around the casing in the bottom of a borehole is sufficiently great, it will leave the casing inadequately supported and the casing may eventually buckle or collapse. In some instances, the sand problem is so severe that the well has to be abandoned. The magnitude of the problem, then, is seen to be considerable.

Various methods have been attempted or suggested to date for solving the problem of sand production in wells that penetrate unconsolidated formations. Two commonly used practices are (1) gravel packing, and (2) plastic in situ consolidation. In the gravel packing procedure, gravel is packed or otherwise placed so that all the oil produced must pass through the gravel pack before entering the production tubing. A common method is to pack the annulus between a slotted liner and the borehole wall. The gravel in effects acts as a filter permitting the oil to pass through but retaining the sand. However, when working with such gravel packs, it has been frequently observed that gravel from the pack is being lost to the formation.

Plastics such as phenol-formaldehyde have been used to consolidate the sand particles within the unconsolidated formations. Unfortunately, this system has a serious drawback in that the plastic injected into the formation is apt to be unevenly distributed, due to the permeability variations throughout the section. In other words, most of the plastic is apt to enter the more permeable zones with very little or none of the plastic going into the less permeable zones.

In certain prior art processes, granular particles have been coated with various epoxy-resin formulations such resin formulations including catalysts, coupling agents, bonding agents, etc.) and the resin-coated grains have been suspended in numerous types of hydrocarbon-carrying fluids. In one system, described in U.S. Pat. No. 3,404,735, a furfuryl alcohol resin precoated and system is blended without a curing agent and pumped into a subterranean earth formation. The curing agent is then squeezed into the packed interval of the subterranean earth formation in an overflush solution. In this system, poor fluid distribution may prevent the curing agent from contacting all of the coated and within the sand pack. In addition, the overflushing may disturb the sand prior to its consolidation. In another system described in U.S. Pat. No. 3,391,738, a mixture of sand, resin and curing agent is pumped in as a thick slurry (as, for example, 13.5 pounds per gallon) and spotted, without squeezing, across the perforated interval of an unconsolidated subterranean earth formation. Disadvantages of this latter system include the necessity of drilling excess sand out of the well casing and the sensitivity of the cure to pH variations.

When a porous integral mass is formed from grains which are coated with an epoxy-amino resin, the compressive strength can be high relative to those obtainable with other types of resins. However, the compressive strength is materially affected by the presence and disposition of a solvent for the resin-forming components and the attainment of a high strength can be prevented by the way those components are handled. For example, the grains may be (1) coated with a liquid mixture of resin components containing catalysts, or activators, etc., that provide a selected rate of polymerization at the temperature of a subterranean earth formation, suspended in an immiscible liquid, pumped into the well, and allowed to consolidate in situ or (2) coated with a liquid solution of the resin components and a resin-component solvent and suspended in a liquid that is completely miscible with the resin-component solvent; or (3) coated as in (2) and suspended in a liquid that is completely immiscible with the resin-component solvent, and pumped into the well and allowed to cure. However, the compressive strengths of the porous integral mass formed by each of the above procedures for coating, suspending and emplacing the coated grains are not as high as desirable for most well treating operations.

SUMMARY OF THE INVENTION

It is an object of this invention to provide an improved method for forming an epoxy resin consolidated gravel pack within a well borehole extending into communication with a subterranean oil-bearing earth formation.

It is a further object of this invention to provide epoxy-resin consolidated, borehole emplaced, sand or gravel packs having high compressive strength.

It is still another object of this invention to pack and consolidate a formation with a slurry of solid granular particles coated with an epoxy resin capable of epoxy binding the granular particles into a consolidated permeable mass.

These and other objects of this invention are accomplished by forming an epoxy-resin consolidated sand or gravel pack within a well borehole penetrating an underground permeable earth formation by injecting or pumping to a selected level within the borehole a slurry of solid granular particles that are coated with a solution of an epoxy resin-forming material and an amino-containing curing agent dissolved in a liquid polar organic solvent and are suspended in a suitable liquid carrier, such as a hydrocarbon carrier, having a limited solubility and thus a limited partitioning or extractive capacity for the polar solvent. The carrier liquid is thus capable of controlling curing and polymerization reaction rate of the resin-forming components of the grain coatings to a selected extent such that under the downhole temperature conditions the coated grains are interbonded to form a high compressive strength epoxy resin-coated consolidated sand and/or gravel pack.

By epoxy resin-forming material is meant one containing polyepoxide radicals having a plurality of vicinal epoxy groups and by an amino-containing curing agent is meant an amine, preferably a polyamine having a plurality of nitrogen atoms having at least one hydrogen atom attached to the nitrogen atoms.

In the process of this invention, the coatings on the epoxy-coated solid granular particles in the slurry are finally polymerized or cured in the form of a sand or gravel pack in place in an annular portion of a borehole and/or in perforations through the casing and cement in a cased portion of a borehole.

DESCRIPTION OF THE PREFERRED EMBODIMENT

Figure 1:
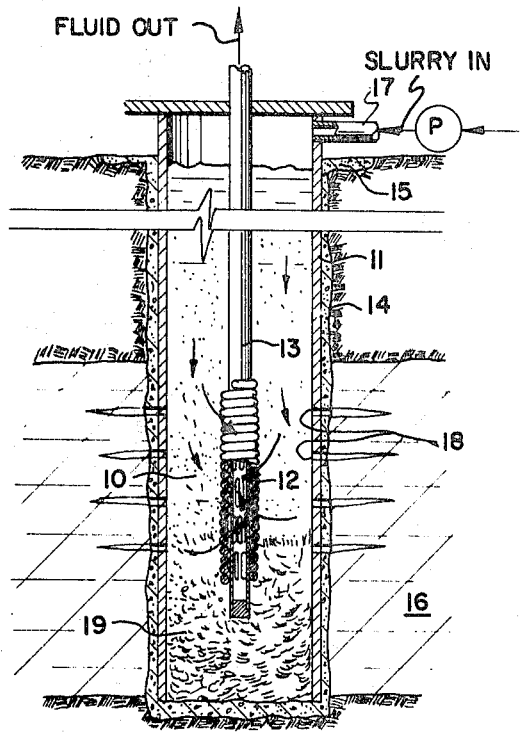
FIG. 1 is a vertical sectional view of one method of treating a well borehole in accordance with the teachings of our invention.

Where used throughout this specification, the phrase "well borehole" may refer to any fluid passageway or conduit opening into subterranean earth formations in fluid communication with a well borehole. Thus, the techniques disclosed herein are applicable to either gravel packing a well borehole or formation, said packing or repacking about a well borehole equipped with perforated casing and/or cement and may be used in either new well completions or in remedial workover operations.

In accordance with the teachings of our invention, the grains of a granular solid are coated with a liquid solution of epoxy-amino resin components dissolved in an epoxy-amino resin-component solvent, in a formation such that the polymerization rate is in part controlled by the relative proportions of the solvent and the resin-forming components. The so-coated grains are suspended in a liquid hydrocarbon that has a significant but limited miscibility with the resin-component solvent.

This slurry system contains two substantially immiscible liquids, the resin components that are dissolved in the polar solvent and the liquid hydrocarbon grain-suspending liquid. It also contains one material, the resin-component solvent, that is completely miscible with the resin components and is only partially miscible with the grain-suspending liquid. Therefore, the resin-component solvent is partitioned to the grain-suspending liquid. This avoids (1) the poor distribution of resin on sand grain surfaces that results from attempting to coat the grains with resin components devoid of solvent (2) the premature curing that results from coating the grains with a resin component solution and suspending them in a liquid that is completely miscible with the resin-component solvent and (3) the weak bond formation that results from coating the grains with a resin component solution and suspending them in a liquid that is immiscible with the resin-component solvent.

The compositions and proportions of the materials in the liquid solution of epoxy-amino resin components dissolved in resin-component solvent may be varied within relatively wide limits.

The epoxy components of the epoxy-amino resin comprise polyepoxides, such as glycidyl polyethers of dihydric phenols and the curing agents and preferably comprise polyamines, such as methylene dianiline, or mixtures of said polyamines and diaminodiphenyl sulfone. The preferred epoxy material is a digylcidylether of bisphenol acetone and is made from bisphenol acetone and epichlorohydrin and the preferred curing agent being methylene dianiline. Silane accelerators which may be used, such as amino-silane (A-1100), have the formula $NH_2-(CH_2)_3-Si-(O-CH_2-CH_3)_3$.

Epoxy resins particularly suitable for coating solid granules such as sand for making the resin-coated sand are described in U.S. Pat. No. 3,339,633 or may be of the type described in Producer's Monthly for May 1968 and the resin compositions as identified therein as Eposand 112 or those described in the Oil and Gas Journal for Apr. 21, 1969, p. 87–91. The sand grains can be coated with epoxy resin as described in these references as long as the curing of the resin is incomplete and the resin components are dissolved in a polar solvent such as an ethoxylated alcohol or ethylacetate. The coated sand grains are then suspended in a liquid carrier such as hydrocarbon, e.g., diesel oil, kerosene or the like and the resulting slurry is pumped into the wall.

In the well-treating method disclosed herein, it is important that the polymerization rate be one that is suited to the temperature and injectivity properties (which affect the duration of the pumping time) of the individual subterranean earth formation being treated in addition to being responsive to the proportion of the resin-component solvent. Preferred formulations include an amino or epoxy-silane such as silane A-1100 or A-186 made by Union Carbide and having the following structural formulas:

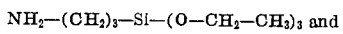
$NH_2-(CH_2)_3-Si-(O-CH_2-CH_3)_3$ and

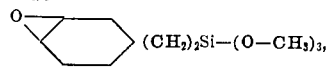

respectively, in proportions such that it functions both as a curing agent and a resin-to-grain bonding agent. Such formations provide improved resistance to brine degradation.

Preferably, determinations are made of both the subterranean earth formation temperature and the equivalent time at that temperature to which the resin coating on the grains will be subjected when the coating components are mixed near the well site and displaced into contact with the earth formation at a pumping rate which is compatible with the injectivity properties of the earth formations. The composition and proportion of the solution of resin components and resin-component solvent are then adjusted to provide both a substantially complete cure within a relatively few hours after the downhole placement of the resin-coated grains and a polymerization rate which is influenced by the proportion of the resin-component solvent.

In general, the resin-component solvent may be substantially any polar organic solvent for the components of an epoxy-resin formulation, such as organic alcohol, esters, ethers, ketones, etc., e.g., 2-(2-ethoxyethoxy)-ethanol, ethyl acetate, methylethyl ketone, methylisobutyl ketone, etc. The grain-suspending liquid may be substantially any hydrocarbon, such as kerosene, diesel fuel, light hydrocarbon oil, bright stock and mixtures thereof or substantially any inert predominantly hydrocarbon solution, having a limited miscibility (such as one in the order of from about 10 to 20 percent by weight) with the resin-component solvent. The grains may comprise any appropriate "sand" or "gravel" sized particulate solid material, such as for example, sand normally in the fine-to-medium, 100 to 250 micron, particle size range. The sand is preferably washed with isopropyl alcohol prior to blending. As mentioned hereinabove, silane compounds may be added to the resin-coated grains before, or after, the grains are coated with the resin component solution, or may be dissolved in the resin component solution, in order to improve the adhesion or physical bond of cured epoxy resins to sand (or any silica) surfaces and assure brine stability.

A pumpable slurry is then formed by suspending the resin-coated grains in a hydrocarbon liquid such as diesel oil or a mixture of diesel oil and bright stock that has a limited miscibility with the resin-component solvent such that the rate of polymerization of the resin components in the slurry is increased by the partitioning of some but not all of the resin-component solvent into the grain-suspending hydrocarbon liquid.

The carrying fluid must be one capable of transporting the partially cured resin-coated sand grains to their destination without undue cure acceleration. For example, kerosene or diesel oil blended with bright stock, a clear oil obtained from the residue of petroleum distillation, may be used as the carrying fluid. Volume ratios of 50/50 kerosene or diesel oil/bright stock have been found to result in the formation of porous integral masses having excellent compressive strengths and a high degree of laboratory test repeatability. Carrying fluids also aid in retarding reaction rate under ambient conditions due to their relatively large volume, some 96 percent carrying fluid by volume, for example. Heat evolved by the exothermic epoxy curing reaction is absorbed by the sand, solvent, and carrying fluid resulting in a negligible temperature rise in the slurry and a relatively constant low rate of reaction until the slurry is pumped down the well borehole, as will be discussed further hereinbelow. Thus, after the slurry is pumped down the well borehole, bottom hole temperatures accelerate the rate of reaction and produce the rapid (e.g., 3 hours or less) cures possible with the coated grains-slurry of our method.

Figure 2:
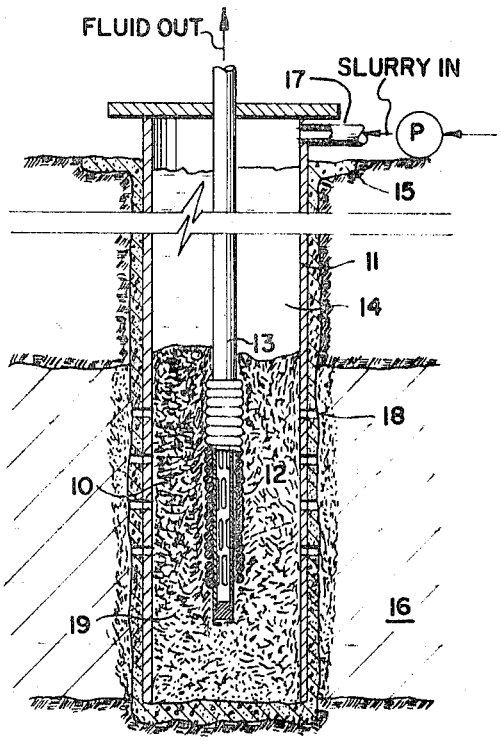
FIG. 2 is a vertical sectional view of the well borehole of FIG. 1 after treatment in accordance with the teachings of our invention.

Referring now to FIG. 1 of the drawing, a preferred technique is illustrated for placing resin-precoated grains, such as sand or gravel particles, in the annular space 10 formed between the casing 11 and a conventional screen assembly 12 fixed to the lower end of a tubing string 13 which is disposed in well borehole 14. Casing 11 is preferably cemented at cementing 15 and the lower end of well borehole 14 communicates with an oil-bearing subterranean earth formation 16. An annulus outlet 17 is disposed at the upper end of casing 15 for pumping the slurry down annulus 10. Casing 11 is perforated at a plurality of perforations 18 extending along earth formation 16. Thus, as indicated by the arrows, the sand/resin slurry is pumped down annulus outlet 17 and into contact with the portion of well borehole 14 in communication with earth formation 16. A "gravel pack" 19 is formed at the lower end of well borehole 14 by maintaining the slurry in contact therewith for a period of time just prior to the time in which a cured resin is formed at the temperature of formation 16 at the rate of polymerization of the resin components in the slurry, thereby passing the suspending hydrocarbon fluid through the well borehole 14, up tubing string 13 and out of well borehole 14 (as indicated by the arrows in FIG. 1) while screening out the resin-coated grains, thus forming gravel pack 19. The slurry is pumped down annulus 10 until gravel pack 19 fills substantially the entire extent of the portion of well borehole 14 in communication with earth formation 16 as illustrated in FIG. 2 wherein like numerals refer to like parts of FIG. 1.

The epoxy-coated gravel pack 19 provides a permanent sand pack in the perforated interval of well borehole 14 to retain formation sand behind the casing 11 and protect screen assembly 12 from erosion. Perforations in a conduit are sized to exclude passage of all of the slurried granular particles and the conduit is positioned in the well borehole at a depth adjacent to the interval thereby forming an annulus between the conduit and the interval. A fluid including the slurry is then flowed down the annulus and into contact with the exterior of the conduit until the annulus is substantially filled with the granular particles.

Figure 3:
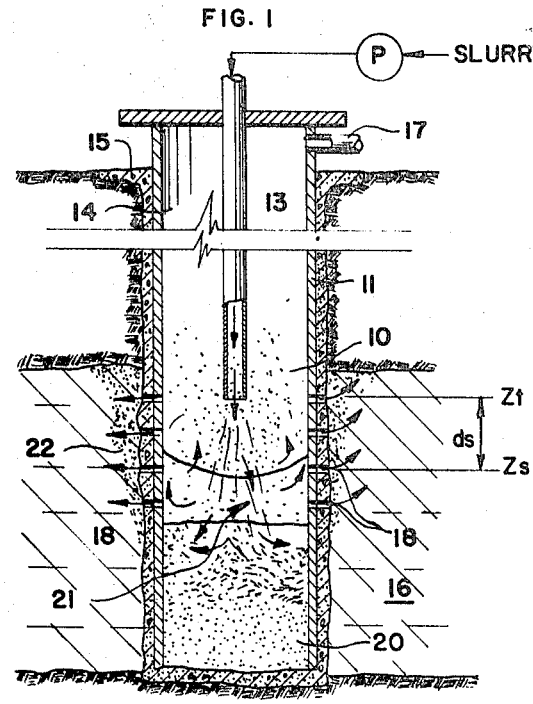
FIG. 3 is a vertical sectional view of an alternate method of treating a well borehole in accordance with the teachings of our invention.

In accordance with the present invention, it may be desired to replace produced formation sand with properly sized and precoated sand behind casing perforations. Thus, as illustrated in FIG. 3 wherein like numerals refer to like parts of FIGS. 1 and 2, the sand/resin slurry of our invention is pumped down tubing string 13 and into the portion of well borehole 14 in communication with oil-bearing subterranean earth formation 16. Clean sand 20 is preferably spotted in well borehole 14 below perforations 18 to prevent inadvertent plugging in the casing 20. As discussed above, the portion of well borehole 14 in communication with formation 16 includes voids, such as cavities and openings, in earth formation 16 communicating with well borehole 14. Thus, a turbulent zone $d_s$ is formed at the lower end of tubing string 13 as the slurry exits therefrom and is indicated by the arrows in FIG. 3. A static annulus fluid column is maintained in well borehole 14 above the portion of borehole 14 in communication with earth formation 16 as is well known in the art. A coated sand buildup area 21 begins to form at the bottom perforation 18 while the slurry passes through perforations 18 into any voids within earth formation 16. The hydrocarbon liquid in the slurry passes through and into earth formation 16 while the resin-coated grains are screened out into the voids therein. In this manner, a gravel pack 21 is formed in well borehole 14 at the lower end thereof and a sand pack 22 is formed a relatively short distance beyond casing 11. After full or partial removal of undesired gravel pack 21, such an epoxy-coated sand pack 22 replaces end permanently retains formation sand without reducing well productivity.

The turbulent zone $d_s$ in FIG. 3 normally extends from the bottom of tubing string 13, $Z_t$, to a point where sand settles and begins building as a layer, $Z_s$. Sand tends to build up within casing 11 shortening the zone, $d_s$, and may not pass readily through any perforations above or below this zone, $d_s$. Above the turbulent zone, $d_s$, the carrying fluid remains relatively clear and little sand is displaced through any perforations so located above zone $d_s$. It thus may be advantageous to maintain the turbulent zone $d_s$ by raising tubing string 13 through the perforated interval (i.e., along perforations 18) in stages of perhaps 1 to 2 feet each throughout the injection process.

Referring now to FIG. 4, where again like numerals refer to like parts of FIG. 3, excess resin-coated grains may be removed from well borehole 14 of FIG. 3 by known techniques, as for example by reverse circulation of uncured resin-coated grains while lowering tubing string 13 to at least the clean sand zone 20. Thus, as indicated by the arrows in FIG. 4, fluid may be circulated through annulus 10 and back up tubing string 13 carrying the excess sand out as indicated.

The resin-curing agent mixture of our method coats the sand grains which are pumped into well borehole 14, thus eliminating the need to overflush the gravel packs of FIGS. 2 and 3 with a curing agent. The porportions of solvent and carrying fluids may be adjusted to control the rate of resin cure. The amount of resin used in our method is only slightly in excess of that required to coat the sand grains and would not plug flowlines, orifices or the formations being treated. Downhole equipment would not stick in a well borehole treated in accordance with our method.

The improvement in compressive strength of the porous integral mass (i.e., gravel packs 13 and 22) that is provided by our procedure is consistent with the following. In our well-treating method, the curing of the resin is proceeding throughout the time and the resin-coated grains are being suspended in the carrier liquid and displaced into a subterranean location in which they are to be bonded together. The curing of a layer of resin proceeds from the outer surface toward the inner surface. Where no solvent is present, the first cured portions become relatively hard and mutually immiscible. This reduces the tendency for the coating on one grain to mix with and adhere to that on an adjacent grain. Where grains coated with a solution of resin components and resin-component solvent are suspended in a liquid which is immiscible with the resin-component solvent, the outer surfaces of the resinous coatings are wetted by the immiscible suspending liquid. This also reduces the tendency for the coating on one grain to mix with and adhere to that on an adjacent grain. On the other hand, where some of the resin-component solvent is present in both the grain coatings and the suspending liquid, the tendency for the coatings on the adjacent grains to mix and interpolymerize is enhanced.

The slurry may be displaced into contact with the portion of well borehole 14 in communication with earth formation 16 by pumping fluid into well borehole 14 and displacing solid-free liquid into earth formation 16 at a rate and pressure such that the resin-coated sand grains are screened out and pressed together along the face of earth formation 16 by a stream of fluid that is flowing through the screened-out grains and into the formation. For example, this can be accomplished by pumping fluid into the well via tubing string 13 of FIG. 3 while allowing relatively little, or no, outflow through annulus outlet 17. During this injection of fluid into the well bore 14, the injection of the slurry of resin-coated grains may be followed by the injection of a fluid that is capable of increasing the rate of polymerization of the grain-coating resin, so that the curing rate of the resin is increased both along the exposed portions of the grain-interbonding resinous coating between those of the coated grains which are pressed together and along the entire surfaces of the resinuous coatings on grains which are substantially separate from each other (since they are suspended in fluid which is not flowing through a mass of screened-out grains adjacent to formation 16).

Figure 4:
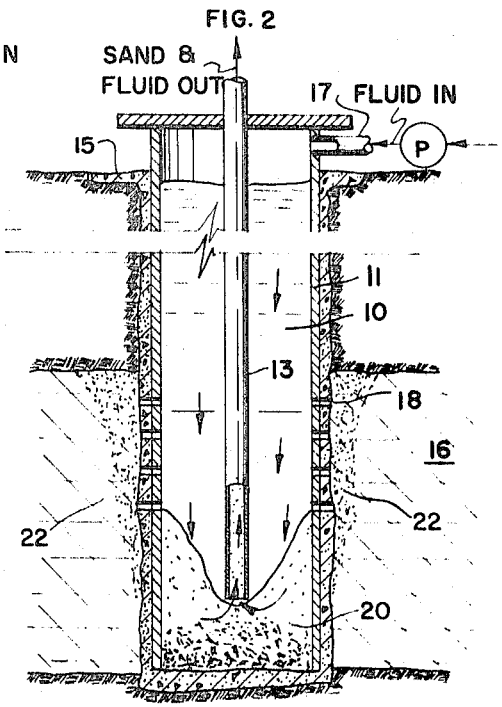
FIG. 4 is a vertical sectional view of a method of cleaning out the well borehole of FIG. 3 after treatment in accordance with the teachings of our invention.

Subsequently, fluid may be circulated into and out of the well bore 14 at a rate sufficient to entrain, and transport to a surface location, resin-coated grains which are suspended in fluid which is not flowing into voids communicating with well borehole 14. For example, this can be accomplished by pumping fluid in through annulus outlet 17 and producing fluid through tubing string 13 as shown in FIG. 4.

The fluid which is used to increase the rate of polymerization of the grain-coating resin may be either a hydrocarbon (such as diesel oil) which is relatively highly miscible with the resin-component solvent and increases the rate of polymerization by extracting the solvent from the solution of resin components and resin-component solvent or a solution (such as diesel-oil solution) that contains a catalyst or an accelerator (such as salicyclic acid or phenol). In general, such a solution would preferably be kept separate from the slurry by injecting a series of slugs, such as a slug of the slurry followed by a slug of suspending liquid free of resin-coated grains preceding a slug of the polymerization rate-increasing fluid.

The curing time of the slurries described hereinabove is dependent upon formation temperature, curing agent concentration, solvent and carrying fluid proportions. For example, in the first slurry composition set forth hereinbelow, a total curing time of approximately 2 hours (at 150° F. and 170° F.) and 4 hours (at 130° F.) resulted in gravel packs having excellent compressive strength in the laboratory.

Following are examples of two preferred slurries in accordance with the teachings of our invention:

EXAMPLE I

SLURRY COMPOSITION I

Temperature: 150° F.

| Component | Laboratory Scale Weight (gms.) | Laboratory Scale Volume (cc.) | Field Scale Weight (lbs.) | Field Scale Volume (gal.) |
|---|---|---|---|---|
| Sand/Epoxy Blend | 130. | 52. | 100. | 4.8 (1 sack) |
| EPON 828[1] | 30. | 25.68 | 23. | 2.36 |
| Silane A-1100 (Amino-Silane) | 2.52 | 2.675 | 1.93 | 0.246 |
| MDA[2] | 7.38 | 6.254 | 3 5.66 | 0.575 |
| EEE[3] | 20. | 20.28 | 15.3 | 1.86 |
| Carrying Fluid | | | | |
| Diesel | 1,020. | 1,250. | 782. | 115. |
| Brightstock[4] | 1,117. | 1,250 | 856. | 115. |
| Total Unit | | | 1,784. | 240. |

Field Data basis: One Unit–one 240-gallon batch of slurry containing one sack of sand (if x sacks of sand are required for the job, x units of slurry are used.)

[1] EPON 828—a low molecular weight epoxy resin manufactured by Shell Chemical Company.
[2] MDA–4,4'-methylenedianiline, solid form.
[3] EEE–2-(2-ethoxyethoxy)-ethanol.
[4] Brightstock—a high velocity index (150) refinery stock.

EXAMPLE II

SLURRY COMPOSITION II

Temperature: 200° F.

| Component | Laboratory Scale Weight (gms.) | Laboratory Scale Volume (cc.) | Field Scale Weight (lbs.) | Field Scale Volume (gal.) |
|---|---|---|---|---|
| Sand/Epoxy Blend | | | | |
| Sand | 130. | 52. | 100. | 4.8 (1 sack) |
| EPON 828 | 30. | 25.68 | 23. | 2.37 |
| Silane A-1100 (Amino-silane) | 2.0 | 2.12 | 1.53 | 0.196 |
| MDA | 8.4 | 7.12 | 6.44 | 0.657 |
| DDS[1] | 3.5 | 2.46 | 3.91 | 0.227 |
| EEE | 20. | 20.28 | 22.3 | 1.87 |
| Carrying Fluid | | | | |
| Diesel | 1,020. | 1,250. | 782. | 115. |
| Brightstock | 1,117. | 1,250. | 856. | 115. |
| Total Unit | | | 1,795 | 240. |

Basis: One 240-gallon batch of slurry contains one sack of sand. (If x sacks of sand are required for the job, use x units of slurry.)

[1] DDS–Diaminodiphenylsulfone, solid form, a curing agent.

The following is an example of a successful treatment of a well borehole in accordance with the teachings of our invention.

EXAMPLE III

WELL TREATMENT

The well borehole was prepared for gravel packing in a conventional manner, assuring the cleanest possible well bore by circulating filtered and treated salt water after a 2 ⅞-inch, 0.012 gauge wire-wrapped screen and liner assembly was placed in position. Saltwater was displaced with clean diesel until the wellbore was water free. The perforations in the well borehole were given a mud acid treatment and precoated gravel, having a grain size in the range of 0.017 to 0.033 inches, was prepared as discussed hereinabove.

The gravel was precoated in batches of 200 pounds (two sacks) of sand and 5 gallons of modified epoxy resin using as a curing agent a mixture of 70% MDA and 30% DDS given an 0.22 resin-sand ratio by weight. Each batch of precoated sand was mixed in ten barrels of carrying fluid consisting of 50 percent diesel oil and 50 percent Brightstock. The precoated sand-oil slurry (½ pound sand per gallon) was pumped into the wellbore at a rate of 1 barrel per minute. Sixteen sacks of sand were placed in this manner with a transit time of approximately 30 minutes. At the conclusion of the placement, the tubing string in the well borehole was released from the screen and liner and pulled a short distance above it. After 5 hours had been allowed for curing, the diesel was displaced with saltwater, and well borehole production equipment was installed.

Initial production was 38 barrels of fluid daily, 80 percent saltwater, on gas lift. Two 1,000-gallon acid stimulation treatments, the last one including a diverter, have increased production to 211 barrels of fluids daily, 32 percent saltwater, on gas lift.

We claim as our invention:

1. A method for forming a consolidated and sand pack or gravel pack within a well borehole extending into communication with a subterranean permeable earth formation, said method comprising the steps of;
    coating the grains of a granular solid with a liquid solution of epoxy-amino resin components dissolved in an epoxy-amino resin-component solvent in proportions providing a selected rate of polymerization that is in part controlled by the relative proportions of the resin components and resin-component solvent and is capable of producing a cured resin at the temperature existing in said borehole adjacent said subterranean earth formation;
    forming a pumpable slurry by suspending said coated grains in a grain-suspending liquid that is substantially immiscible with said resin components and has a limited miscibility with sand resin-component solvent such that in said slurry the rate of polymerization of the resin components is increased by the transferring of some but not all of the resin-component solvent from the grain coatings to the grain-suspending liquid;
    pumping said slurry down said well borehole and into the portion of said well borehole that communicates with said permeable earth formation; and
    screening out said coated grains on the face of said permeable earth formation prior to the time at which a cured resin is formed at the temperature of the borehole adjacent said permeable earth formation at the rate of polymerization of the resin components in said slurry by displacing grain-suspending liquid into pores of said permeable earth formation.

2. The method of claim 1 including the steps of:

extending a tubing string having a screen assembly fixed at the lower end thereof down said well borehole until said screen assembly is disposed adjacent said permeable earth formation, thus forming an annulus therebetween; and wherein said step of pumping the slurry is carried out by pumping said slurry down said annulus and subsequently screening out said coated grains in said annulus until a porous mass comprising said coated grains is formed substantially filling the entire extent of said annulus.

3. The method of claim 1 including the steps of:

extending a tubing string down said well borehole, thereby forming an annulus between said tubing string and said earth formation; and subsequently pumping said slurry down said tubing string into the portion of said well borehole communicating with said earth formation until a permeable mass comprising said resin-coated grains is forced within any voids in said earth formation communicating with said well borehole.

4. The method of claim 3 including the step of removing excess resin-coated grains from said well borehole by circulating fluid down said annulus, up said tubing string, and out of said well borehole.

5. The method of claim 1 including the step of adding a significant proportion of an amino silane to the liquid solution of epoxy-amino resin components dissolved in epoxy-amino resin-component solvent.

6. The method of claim 1 wherein said epoxy-amino resin-component solvent comprises a polar organic solvent.

7. The method of claim 1 wherein the step of suspending said coated grains in a hydrocarbon liquid includes the step of suspending said coated grains in an inert predominantly hydrocarbon solvent having a miscibility from about 10 to 20 percent by weight with said resin-component solvent.

8. The method of claim 7 wherein the step of suspending said resin-coated grains in a hydrocarbon liquid includes the step of suspending said grains in a liquid mixture having a volume ratio of 50/50 of diesel oil to brightstock.

9. The method of claim 7 wherein the step of suspending said resin-coated grains in a hydrocarbon liquid includes the step of suspending said grains in a liquid mixture having a volume ratio of 50/50 of kerosene to brightstock.

10. The method of claim 1 including the step of following the pumping of said slurry down said well borehole with a pumping of fluid capable of increasing the rate of polymerization of the resin components of said liquid solution.

11. The method of claim 1 including the step of washing said grains with isopropyl alcohol prior to coating said grains.

12. An improved method of consolidating a sand formation or gravel pack in a well borehole comprising injecting into the portion of the borehole to be packed a pumpable slurry of grains coated with an incompletely polymerized epoxy resin that contains a curing agent and is dissolved in a liquid polar solvent with said coated grains being suspended in a liquid carrier having a limited miscibility with the polar solvent such that in said suspension the curing rate of the resin is increased by the transferring of some but not all of the resin-component solvent form the grain coatings to the grain-suspending liquid so that polymerization is completed and the consolidation of the coated grains into an integral porous mass takes place in the well borehole at the time said mass is disposed against the face of the formation.

13. The method of claim 12 wherein the slurry injection is followed by injection through the mass of coated grains of the liquid carrier which is a liquid hydrocarbon.

14. The method of claim 13 wherein the epoxy material is one containing a plurality of epoxy groups, the curing agent being a polyamine and the polar solvent is an oxygen-containing organic liquid miscible with the epoxy material and the liquid carrier is a liquid hydrocarbon.

15. A method for forming an integral porous mass within and around the borehole of a well that contains a perforated casing in fluid communication with a permeable earth formation, comprising:

coating the grains of a granular solid with a liquid solution of epoxy-amino resin components dissolved in an epoxy-amino resin-component solvent in proportions providing a curing rate that is relatively low at the temperature within the casing;

suspending the coated grains in a liquid that is partially miscible with the resin-component solvent;

pumping the suspension into the casing and displacing liquid into the surrounding earth formation so that coated grains are screened out and pressed together against the face of the earth formation;

pumping fluid capable of increasing the curing rate of the resin components through the casing and the screened out coated grains and into the earth formation; and subsequently circulating fluid capable of entraining discrete coated grains within the casing to entrain and remove discrete coated grains, so that coated grains which are not bonded into an integral porous mass are removed from the casing.

* * * * *